Figure 1:
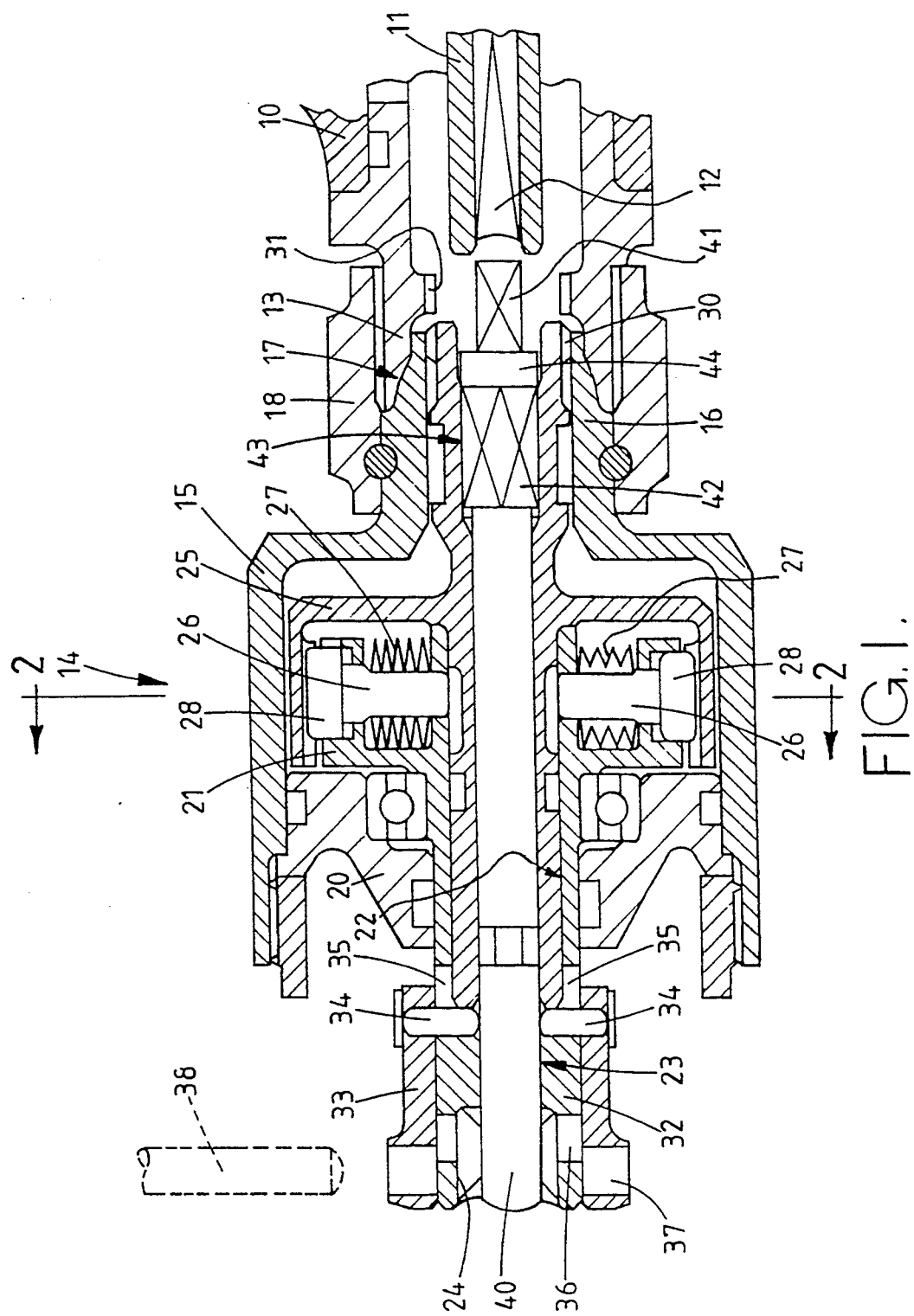

United States Patent [19]

Davies

[11] Patent Number: 5,359,848
[45] Date of Patent: Nov. 1, 1994

[54] DEVICE FOR OPERATION OF A GAS TURBINE ENGINE THRUST REVERSER SYSTEM

[75] Inventor: Stephen H. Davies, Telford, England

[73] Assignee: Lucas Industries public limited company, West Midlands, England

[21] Appl. No.: 852,317

[22] Filed: Mar. 27, 1992

[30] Foreign Application Priority Data

Mar. 27, 1991 [GB] United Kingdom ............ 9106515.1

[51] Int. Cl.⁵ .............................................. F02K 3/02
[52] U.S. Cl. .................... 60/226.2; 192/12 R
[58] Field of Search .............. 60/226.2, 230, 39.33; 192/12 R, 18 R

[56] References Cited

U.S. PATENT DOCUMENTS

| | | | |
|---|---|---|---|
| 4,012,966 | 3/1977 | Lieberman et al. | 192/12 R |
| 4,519,561 | 5/1985 | Timms | 60/230 |
| 4,586,329 | 5/1986 | Carlin | 60/226.2 |

Primary Examiner—Richard A. Bertsch
Assistant Examiner—M. Rocharov
Attorney, Agent, or Firm—Trexler, Bushnell, Giangiorgi & Blackstone, Ltd.

[57] ABSTRACT

A device is provided for hand operation of a gas turbine engine thrust reversing system. Torque is applied to an input element and transmitted to an output element by way of a torque limiting means arranged to substantially remove the torque from the output element when the torque exceeds a threshold. The device also includes means to lock the thrust reverser against movement.

8 Claims, 2 Drawing Sheets

5,359,848

DEVICE FOR OPERATION OF A GAS TURBINE ENGINE THRUST REVERSER SYSTEM

Where a gas turbine engine is provided with a thrust reverser system it is necessary during engine maintenance to operate that system by hand. Thrust reversers which operate on a cold bypass airstream of the engine are commonly operated by plurality of hydraulic actuators of the type disclosed in U.S. Pat. No. 3,621,763, in which an element is rotated by axial movement of the actuator output. The rotary elements of all of the actuators on one engine are coupled together by a synchronising drive cable to ensure their rotation in unison, whereby the actuator outputs are also constrained to move in unison. The gearing between the actuator outputs and the drive cable is such that the latter rotates at relatively high speed. This gearing is therefore such that an external drive of relatively low torque applied to the cable can readily result in linear movement of the actuator outputs. It is known to provide a free end of the synchronising cable with means for coupling an external drive thereto.

However, the aforesaid gearing will permit a hand-wound input to result in damage to the thrust reverser system should the latter encounter an obstruction during its movement, such an obstruction being more probable during engine maintenance. It is desirable that such damage should be prevented from occurring. It is also desirable that the thrust reverser and its actuators should readily be lockable in a desired operating position at any time during hand operation. It is an object of the present invention to provide a device for hand operation of thrust reversers of a gas turbine engine, in which the foregoing requirements are met.

According to the invention a device for hand operation of a gas turbine engine thrust reversing system comprises an output drive element selectively engageable with a rotatable part of said system, an input drive element, a torque limiting device between said input and output drive elements, and a component drivingly coupled to said output drive element and selectively engageable with a relatively fixed part of said system, to prevent movement of said rotatable part.

In a particular embodiment said component comprises a part of said torque limiting device.

Figure 2:
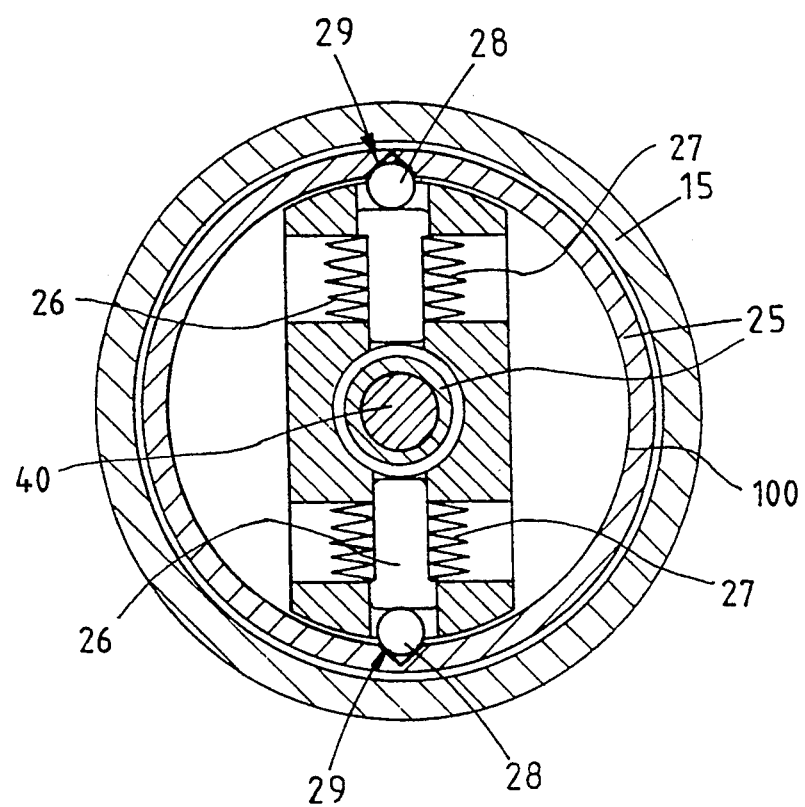

An embodiment of the invention will now be described by way of example only and with reference to the accompanying drawings in which:

FIG. 1 is a longitudinal section through a device according to the invention, and FIG. 2 is a section on line 2—2 in FIG. 1.

As shown in FIG. 1 a fixed housing 10 of a hydraulic actuator for a gas turbine engine thrust reverser supports a free end 11 of a synchronising cable which interconnects a plurality of actuators for the aforesaid thrust reverser system. The free end 11 has a socket 12 of square cross section. The housing 10 has an externally threaded extension 13. A hand-operable drive device 14 for the synchronising cable has a housing 15. An end portion 16 of the housing 15 and the extension 13 have complementary mating faces 17 which are urged into pressure-tight engagement by a nut 18 which is captive on the end portion 16. The inside of the housing 10 adjacent the free end 11 communicates with one side of the actuator piston, and thus in normal use contains hydraulic fluid which is either at a high actuating pressure or a lower return pressure, depending on the direction of thrust reverser operation.

The housing 15 has an end cap 20 in which a detent carrier 21 is journalled. The carrier 21 extends externally of the housing 15 and has a stepped through bore 22 whose end 23 external to the housing 15 is formed with a square-section socket 24. A cage 25 is journalled within the bore 22 and in the end portion 16 of the housing 15, so as to be both rotatable and axially slidable. The carrier 21 supports diametrally aligned plungers 26, shown more clearly in FIG. 2, which are biassed radially outwards by spring washers 27. The plungers 26 urge rollers 28 into respective grooves 29 in an inner circumferential surface 30 of the cage 25. The end of the cage 25 within the housing portion 16 carries external splines 30 which are engageable with complementary splines 31 in the housing 10.

Axially slidable on the other end 32 of the carrier 21 is a collar 33. Two diametrally aligned pins 34 extend radially inwardly through slots 35 in the carrier 21 to limit axial movement of the collar 33. Transverse bores 36, 37 in the carrier 21 and cage 25 respectively may be brought into alignment within the travel permitted by the slots 35, and maintained in that alignment by a suitable retaining pin, indicated at 38. The pins 34 abut the end of the cage 25 remote from the housing 10. A spindle 40 is axially slidable in a bore in the cage 25 and has a square-section end 41 engageable in the socket 12. A further square-section portion 42 of the spindle 40 engages a complementary surface 43 within the cage 25. A flange 44 on the spindle 40 limits travel of the latter in a direction away from the housing 10.

In normal operation fluid pressure within the housing 10 urges the cage 21 and spindle 40 leftwards, as viewed in the drawing, to their limits of travel defined by the pins 34 and slots 35, and by the flange 44. The spindle 40 will thereby be out of driving engagement with the socket 12. When it is required to operate the thrust reverse system manually by way of the end 11 of the synchronising cable, no hydraulic pressure will be present in any of the actuators. A suitable tool is inserted in the socket 24 and urges the spindle 40 rightwards into driving engagement with the socket 12. Rotation of the tool drives the detent carrier 21 which in turn, in the absence of an excessive torque load, drives the cage 25. The cage 25 rotates the spindle 40 by way of the portion 42 thereof, and the thrust reverser is thereby driven in a direction dependent of the direction of rotation of the tool.

At any desired point in the travel of the thrust reverser its movement may be stopped and the sleeve 33 and cage 25 moved to align the bores 36,37, the cage 25 being maintained in this position by insertion of the retaining pin 38. In this position of the cage 25 the splines 30 thereon engage the splines 31 in the housing 10, preventing rotation of the cage 25 and, by way of the portion 42 of the spindle 40, locking the latter and the synchronising cable against rotation. After removal of the retaining pin 38, re-application of hydraulic pressure to operate the actuators in either direction will result movement of the cage 25 and spindle 40 leftwards to disengage the splines 30,31 and to withdraw the spindle end 41 from the socket 12. Both the actuating and return pressures applied to the actuators used in thrust reverser systems are sufficiently high to effect the aforesaid disengagement and withdrawal.

The torque which can be transmitted from the carrier 21 to the cage 25 is set by the spring washers 27 to a level below that at which damage to any component of the thrust reversing system can occur as a result of interference with its travel.

I claim:

1. A device for hand operation of a gas turbine engine thrust reversing system having a rotatable part, said device comprising an input drive element, an output drive element, a torque limiting device for limiting torque, and an engagement means for selectively engaging a relatively fixed part of the thrust reversing system, said torque limiting device being arranged between said input drive element and said output drive element, said output drive element being selectively engagable with the rotatable part of the thrust reversing system, and said engagement means being coupled to said output drive element and selectively engagable with the relatively fixed part to prevent rotation of the rotatable part when said output drive element is engaged with the rotatable part.

2. A device as claimed in claim 1, in which said output drive element is movable between a disengaged position out of engagement with the rotatable part of the system, and an engaged position for operating the system.

3. A device as claimed in claim 2, in which the rotatable part is held within a housing that contains a fluid, and operation of the thrust reversing system increases a pressure within the fluid such that the fluid acts on said output drive element so as to urge said output drive element to the disengaged position.

4. A device as claimed in claim 1, in which said torque limiting device comprises a first member, a second member, and at least one plunger carried on said first member, said at least one plunger being slidable radially with respect to said first member and being biased radially outward of said first member, said second member having an inner surface defining a recess for receiving said at least one plunger.

5. A device as claimed in claim 4, further comprising a drive component, said drive component being arranged between said second member and said output drive element for transmission of rotation from said second member to said output drive element.

6. A device as claimed in claim 5, in which said second member and said output drive element are co-axial.

7. A device as claimed in claim 4, in which said second member is slidable with respect to said output drive element to engage a fixed portion of the thrust reversing system so as to prevent rotation of said output drive element.

8. A device as claimed in claim 7, in which said second member further comprises splines for engaging with splines fixed to the relatively fixed part of the thrust reversing system.

\* \* \* \* \*